(12) United States Patent
Cool et al.

(10) Patent No.: US 9,189,246 B2
(45) Date of Patent: *Nov. 17, 2015

(54) METHOD AND APPARATUS TO SUPPORT SEPARATE OPERATING SYSTEMS IN PARTITIONS OF A PROCESSING SYSTEM

(71) Applicant: Intel Corporation, Santa Clara, CA (US)

(72) Inventors: Lyle Cool, Beaverton, OR (US); Saul Lewites, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/761,413

(22) Filed: Feb. 7, 2013

(65) Prior Publication Data

US 2013/0254522 A1 Sep. 26, 2013

Related U.S. Application Data

(63) Continuation of application No. 12/589,630, filed on Oct. 26, 2009, now Pat. No. 8,380,973, and a continuation of application No. 11/407,425, filed on Apr. 19, 2006, now Pat. No. 7,610,481.

(51) Int. Cl.
*G06F 9/445* (2006.01)
*G06F 9/44* (2006.01)

(52) U.S. Cl.
CPC ............ *G06F 9/4405* (2013.01); *G06F 9/4401* (2013.01); *G06F 9/4403* (2013.01); *G06F 9/4406* (2013.01)

(58) Field of Classification Search
CPC ... G06F 9/4401; G06F 9/4403; G06F 9/4405; G06F 9/4406; G06F 9/441; G06F 9/44; G06F 15/177
USPC .................................................. 713/1, 2, 100
See application file for complete search history.

(56) References Cited

U.S. PATENT DOCUMENTS 6,934,833 B2   8/2005  Larvoire
6,973,517 B1  12/2005  Golden et al.
(Continued)

FOREIGN PATENT DOCUMENTS

KR   10-2001-0082040 A   8/2001
WO         99/41672 A1   8/1999
(Continued)

OTHER PUBLICATIONS

Bob Bogowitz et al., "Reducing Costs with Intel Active Management Technology", White Paper—Intel Information Technology, IT @Intel, Aug. 2005, 16 pages.

(Continued)

*Primary Examiner* — Fahmida Rahman
(74) *Attorney, Agent, or Firm* — Schwabe, Williamson & Wyatt, P.C.

(57) ABSTRACT

A processing system with multiple processing units may support separate operating systems (OSs) in separate partitions. During an initialization process, a preboot manager in the processing system may copy software to a sequestered area of memory in the processing system. The preboot manager may also configure the processing system to hide the sequestered area of memory from a first partition of the processing system. Also, the preboot manager may use a first processing unit in the processing system to boot an OS on the first partition, and the preboot manager may transmit a boot trigger from the first processing unit to a second processing unit in the processing system. The boot trigger may cause the second processing unit to use the software in the sequestered area of memory to boot a second partition of the processing system. Other embodiments are described and claimed.

25 Claims, 7 Drawing Sheets

(56) References Cited

U.S. PATENT DOCUMENTS

| | | | |
|---|---|---|---|
| 6,996,706 | B1 | 2/2006 | Madden et al. |
| 7,089,411 | B2 | 8/2006 | Lindeman |
| 7,249,208 | B2 * | 7/2007 | Aslot et al. .................. 710/104 |
| 7,418,586 | B2 | 8/2008 | Lewites |
| 7,441,112 | B2 | 10/2008 | Zimmer et al. |
| 7,610,481 | B2 | 10/2009 | Cool et al. |
| 7,640,426 | B2 | 12/2009 | Garney |
| 7,716,465 | B2 | 5/2010 | Lewites |
| 7,802,081 | B2 | 9/2010 | Schultz et al. |
| 7,913,226 | B2 | 3/2011 | Lowell et al. |
| 8,380,973 | B2 | 2/2013 | Cool et al. |
| 2002/0124040 | A1 | 9/2002 | Foster et al. |
| 2002/0156824 | A1 | 10/2002 | Armstrong et al. |
| 2003/0009654 | A1 | 1/2003 | Nalawadi et al. |
| 2003/0037178 | A1 | 2/2003 | Vessey et al. |
| 2003/0115443 | A1 | 6/2003 | Cepulis et al. |
| 2004/0068645 | A1 | 4/2004 | Larvoire et al. |
| 2004/0181647 | A1 | 9/2004 | DeSota et al. |
| 2004/0215917 | A1 * | 10/2004 | Lambeth et al. .............. 711/206 |
| 2005/0125580 | A1 | 6/2005 | Madukkarumukumana et al. |
| 2005/0144434 | A1 | 6/2005 | Taylor et al. |
| 2005/0289283 | A1 | 12/2005 | Warrier et al. |
| 2006/0010276 | A1 * | 1/2006 | Arndt et al. .................. 710/305 |
| 2006/0294234 | A1 * | 12/2006 | Bakke et al. .................. 709/225 |
| 2007/0113063 | A1 | 5/2007 | Lewites |
| 2007/0130453 | A1 | 6/2007 | Lewites |
| 2007/0168399 | A1 | 7/2007 | Schultz et al. |
| 2007/0234031 | A1 | 10/2007 | Garney |
| 2007/0250691 | A1 | 10/2007 | Cool et al. |
| 2010/0131746 | A1 | 5/2010 | Cool et al. |

FOREIGN PATENT DOCUMENTS

| | | |
|---|---|---|
| WO | 2005/006186 A2 | 1/2005 |
| WO | 2007/058887 A2 | 5/2007 |
| WO | 2007/123885 A1 | 11/2007 |

OTHER PUBLICATIONS

Thomas Schultz—U.S. Appl. No. 11/241,247, filed Sep. 30, 2005—Exposed sequestered partition apparatus, systems, and methods.
Saul Lewites—U.S. Appl. No. 11/273,817, filed Nov. 15, 2005—Method and apparatus for maintaining a partition when booting another partition.
Saul Lewites—U.S. Appl. No. 11/294,839, filed Dec. 5, 2005—Method and apparatus for assigning devices to a partition.
John Garney—U.S. Appl. No. 11/396,126, filed Mar. 31, 2006—Methods and apparatus to optimized BIOS for a partioned platform.
Intel 110 Controller Hub 6 (ICH6) Family, Datasheet, Jan. 2005—ftp://download.intel.com/design/chipsets/datashts/30147302.pdf.
Intel Corporation, "Intel® 82573EN/L Gigabit Ethernet Controllers", Product Brief-Network Connectivity, Intel® PRO, Network Connections, 2005, whole document.
Bob Bogowitz et al., "Intel® Active Management Technology Reduces IT Costs with Improved PC Manageability", Technology@Intel Magazine, Sep. 2004, 7 pages.
PCT/US2007/009337, PCT Search Report and Written Opinion mailed Sep. 19, 2007, Intel Corporation, 10 pages.
Office Action Received for U.S. Appl. No. 11/407,425, mailed on Dec. 11, 2008, 21 pages.
Notice of Allowance Received for U.S. Appl. No. 11/407,425, mailed on Jun. 8, 2009, 10 pages.
Office Action Received for European Patent Application No. 07755567.0, mailed on Sep. 3, 2009, 4 pages of Office Action.
Office Action Received for European Patent Application No. 07755567.0, mailed on Apr. 1, 2010, 3 pages of Office Action.
Office Action Received for European Patent Application No. 07755567.0, mailed on Oct. 12, 2010, 4 pages of Office Action.
Office Action Received for European Patent Application No. 07755567.0, mailed on Oct. 27, 2011. 6 pages of Office Action.
Office Action Received for Chinese Patent Application No. 200780013599.0, mailed an Mar. 1, 2010,4 pages of Office Action and 8 pages of English Translation.
Office Action Received for Chinese Patent Application No. 200780013599.0, mailed on May 25, 2011, 3 pages of Office Action and 5 pages of English Translation.
Eskesen et al., "Sofware Exploitation of a Fault-Tolerant Computer with a Large Memory", Proceedings of The Twenty-Eight Annual internationl Symposium on Fault-Tolerant Computing, Jun. 23-25, 1998, 10 pages.
Office Action Received for Chinese Patent Application No. 200780013599.0, mailed on Apr. 5, 2012, 3 pages of Office Action and 4 pages of English Translation.
International Preliminary Report on Patentability for Patent Application No. PCT/US2007/009337, mailed Oct. 30, 2008, 1 page.
Notification to Grant Patent Right received from Chinese Patent Application No. 200780013599.0, mailed on Jan. 15, 2013, 2 pages of Chinese Notification and 3 pages of unofficial English translation.
Notice of Allowance received for U.S. Appl. No. 12/589,630, mailed on Oct. 19, 2012, 32 pages.
Office Action received for U.S. Appl. No. 12/589,630, mailed on Mar. 13, 2012, 22 pages.
Extended European Search Report received for European Patent Application No. 07755567.0, mailed on Jul. 3, 2009, 6 pages.

* cited by examiner

METHOD AND APPARATUS TO SUPPORT SEPARATE OPERATING SYSTEMS IN PARTITIONS OF A PROCESSING SYSTEM

CROSS REFERENCE TO RELATED APPLICATIONS

The present application is a continuation of U.S. patent application Ser. No. 12/589,630, issued as U.S. Pat. No. 8,380,973, entitled "Method And Apparatus To Support Independent Systems In Partitions Of A Processing System" filed on Oct. 26, 2009, which is a continuation of U.S. patent application Ser. No. 11/407,425, issued as U.S. Pat. No. 7,610,481, entitled "Method And Apparatus To Support Independent Systems In Partitions Of A Processing System" filed on Apr. 19, 2006.

FIELD OF THE INVENTION

The present disclosure relates generally to the field of data processing, and more particularly to methods and related apparatus to support the loading of separate operating systems or software environments in different partitions of a processing system.

BACKGROUND

In a typical legacy data processing system, firmware provides the machine instructions that control the system when the system is being powered up or has been reset, but before an operating system (OS) is booted. That is, the firmware controls the pre-OS or pre-boot operations. Firmware may also control certain operations after the OS has been loaded, such as operations for handling certain hardware events and/or system interrupts. The firmware may handle pre-boot and post-boot operations through a set of routines referred to collectively as a basic input/output system (BIOS). The BIOS thus provides the interface between the hardware components of the system and software components such as the OS.

Some years ago, the extensible firmware interface (EFI) model was announced. Version 1.10 of the EFI Specification, dated Dec. 1, 2002, (the "EFI Specification") may be obtained from the URL xwwwx.intel.com/technology/efi/main_specification.htm, where the characters "www" in the URL have been replaced with the characters "xwwwx" to avoid an active link from within this document. The EFI Specification defines a set of standard interfaces and structures to be provided by low-level platform firmware. Those interfaces and structures may be used for tasks such as loading additional firmware, running pre-boot applications, booting the OS, and providing runtime services after an OS has been booted. The Intel® Platform Innovation Framework for EFI is an example of a platform framework that is based on the EFI model.

There are not expected to be any future versions of the EFI specification. However, in 2006, the Unified EFI Forum released Version 2.0 of the Unified EFI (UEFI) Specification, dated Jan. 31, 2006 (the "UEFI Specification"). The UEFI Specification may be obtained from the URL xwwwx.uefi.org/index.php?pg=4, where the characters "www" in the URL have been replaced with the characters "xwwwx" to avoid an active link from within this document. The UEFI specification is based on the EFI specification, with corrections and changes managed by the Unified EFI Forum. In the coming years, EFI-based or UEFI-based platform frameworks may supplant frameworks based on the legacy BIOS model as the frameworks of choice for designing, building, and operating data processing systems.

For purposes of this disclosure, the terms "firmware" and "BIOS" refer to software that may execute in a processing system before the processing system has booted to an OS, software that may provide runtime services that allow the OS or other components to interact with the processing system hardware, and similar types of software components. Thus, the terms "firmware" and "BIOS" include, without limitation, software based on the UEFI model and software based on the legacy BIOS model. Traditionally, firmware has typically been stored in non-volatile memory. In more recent years, however, processing systems have been developed that store firmware in other types of storage devices or obtain firmware from remote repositories.

For purposes of this disclosure, depending upon the particular implementation under consideration, the term "processing unit" may denote an individual central processing unit (CPU) within a processing system, a processing core within a CPU, a logical processing unit such as a hyper-thread (HT), or any similar processing resource, or any collection of such resources configured to operate collectively as a unit. In a system where multiple processing units exist, the OS normally owns all of the processing units. However, virtualization software, such as a virtual machine monitor (VMM), may be used to allocate one processing unit to one virtual machine (VM), and another processing unit to another VM.

Also, in some processing systems, it is possible to hide one or more of the processing units from the OS, for instance by modifying the advanced configuration and power interface (ACPI) tables produced by the BIOS. In some systems it is also possible to hide one or more portions of random access memory (RAM) from the OS. Additionally, in some systems, several peripheral and integrated devices can be hidden from the OS, for example by updating device-hide registers or other locations in the system's input/output (I/O) controller hub (ICH). These techniques may be used to hide devices for debugging purposes.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

In addition to conventional uses for debugging purposes, the techniques described above may also be used to create two (or more) execution environments within a single computer or data processing system that has multiple processing units.

Such an execution environment may also be called a partition. For instance, a processing system may include a main partition and a sequestered partition. The main partition may include a general purpose OS (e.g., one of the various Windows®-based OSs, a Linux®-based OS, etc.) and one or more user applications (e.g., a web server, a business application, etc.). The sequestered partition may not be visible to the main OS, and the sequestered partition may be used for a wide variety of applications, including, without limitation, I/O offloading, platform manageability, and/or fault prediction.

One or more embodiments of the present invention pertain to methods and apparatus for supporting separate operating systems in partitions of a processing system.

Figure 1:
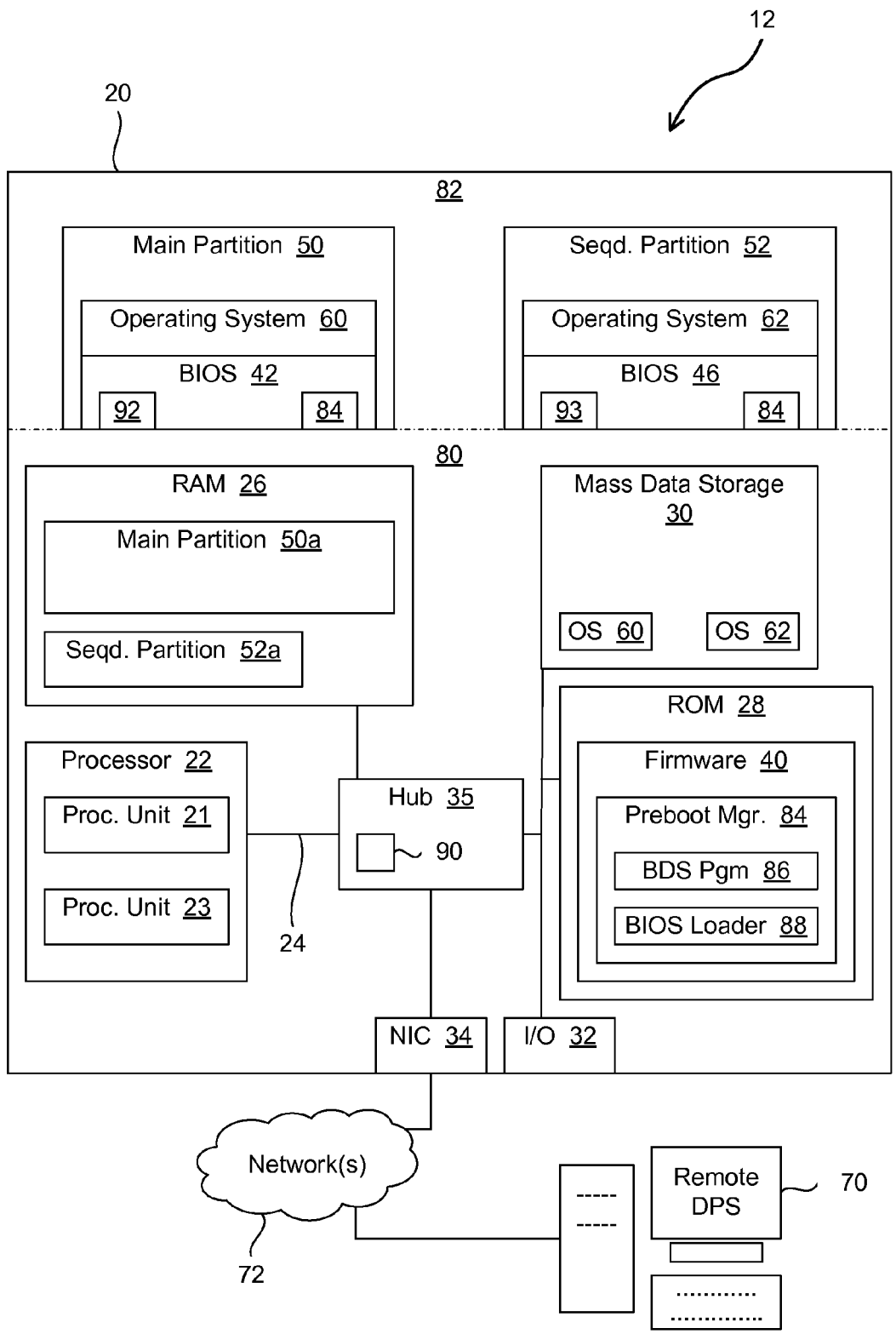
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, one or more processors or CPUs 22, communicatively coupled, directly or indirectly, to various other components via one or more system buses 24 or other communication pathways or mediums. In the example embodiment, processor 22 includes multiple processing units, such as a first processing core 21 and a second processing core 23. Alternatively, a processing system may include multiple processors, each having at least one processing unit. The processing units may be implemented as processing cores, as HT resources, or as any other suitable technology for executing multiple threads simultaneously or substantially simultaneously. In example embodiments, processing unit 21 may serve as a bootstrap processor (BSP) for processing system 20, and processing unit 23 may serve as an application processor (AP).

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Input devices may communicate with processing system 20 via an I/O port 32, for example. Processing system 20 may also respond to directives or other types of information received from other processing systems or other input sources or signals. Processing system 20 may utilize one or more connections to one or more remote data processing systems 70, for example through a network interface controller (NIC) 34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 22 may be communicatively coupled to one or more volatile or non-volatile data storage devices, such as RAM 26, read-only memory (ROM) 28, and one or more mass storage devices 30. The mass storage devices 30 may include, for instance, integrated drive electronics (IDE), small computer system interface (SCSI), and serial advanced technology architecture (SATA) hard drives. The data storage devices may also include other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc.

Processor 22 may also be communicatively coupled to additional components, such as one or more video controllers, SCSI controllers, network controllers, universal serial bus (USB) controllers, I/O ports, input devices such as a camera, etc. Processing system 20 may also include one or more bridges or hubs 35, such as a memory controller hub (MCH), an ICH, a peripheral component interconnect (PCI) root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as on-board or embedded controllers, using components such as programmable or non-programmable logic devices or arrays, application-specific integrated circuits (ASICs), embedded processors, smart cards, etc.

In the example embodiment, processing system 20 uses firmware-based partitioning. Specifically, after processing system 20 has been started or powered on, firmware 40 may create a main partition 50 and a sequestered partition 52 within processing system 20. Main partition 50 may include the firmware code (e.g., BIOS 42) and the OS code (e.g., OS 60) running on the BSP. Sequestered partition 52 may include the firmware code (e.g., BIOS 46) and the OS code (e.g., OS 62) running on the AP. The main partition may also be referred to as a non-sequestered partition. In alternative embodiments, partitions may run on other types of processing units.

In the example embodiment, an ICH 37 (illustrated in FIG. 2) includes configuration constructs such as device hide registers 90 that allow various components or devices within processing system 20 to be disabled or hidden. For instance, the configuration constructs may be used to cause ICH 37 to block configuration cycles for certain devices. Also, in the example embodiment, ACPI parameters 92 for main partition 50 may be used to hide processing unit 23 and one or more portions of RAM 26 from OS 60, while ACPI parameters 93 for sequestered partition 52 may be used to hide processing unit 21 and other portions of RAM 26 from OS 62.

Additional details about device hide registers and related topics may be obtained from the Intel® I/O Controller Hub 6 (ICH6) Family Datasheet, dated January 2004 (the "ICH6 datasheet"). The ICH6 datasheet may be obtained from the URL xhttpx://www.intel.com/design/chipsets/datashts/301473.htm, where the characters "http" in the URL have been replaced by the characters "xhttpx" to avoid an active link from within this document. Additional details about ACPI parameters and related topics may be obtained from Revision 3.0a of the Advanced Configuration And Power Interface Specification, dated Dec. 30, 2005 (the "ACPI specification"). The ACPI specification may be obtained from the URL xwwwx.acpi.info/spec.htm, where the characters "www" in the URL have been replaced by the characters "xwwwx" to avoid an active link from within this document.

In alternative embodiments, other data storage constructs within an ICH and/or within one or more other components may be used to disable or hide devices within a processing system, and other techniques may be used to hide processing units and portions of RAM.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

For instance, ROM 28, data storage device 30, and/or RAM 26 may include various sets of instructions which, when executed, perform various operations. Such sets of instructions may be referred to in general as software.

In the example embodiment, processing system 20 uses techniques such as those described above to create two distinct partitions in processing system 20: main partition 50 and sequestered partition 52. In alternative embodiments, a processing system may have more than one main partition and/or more than one sequestered partition.

In one example embodiment, the programs or software components 82 may include a distinct instance of firmware 40 for each partition. Each partition may also receive its own OS and its own applications. For instance, in one example embodiment, each partition receives some or all of the firmware code 40 from ROM 28. In particular, as illustrated in FIG. 1, processing system 20 loads one instance of firmware 40 (i.e., BIOS 42) into main partition 50, and another instance (i.e., BIOS 46) into sequestered partition 52. The OS 60 for main partition 50 may be the same as, or different from, the OS 62 for sequestered partition 52.

In a second example embodiment, processing system 20 may load firmware, a general purpose OS, and corresponding applications into main partition 50, and processing system 20 may load an embedded OS into sequestered partition 52. The embedded OS may consist of a monolithic package of instructions that is loaded into sequestered partition 52 and then provides all or substantially all of the services or functions to be performed by sequestered partition 52. For purposes of this disclosure, an embedded OS is software that provides the kind of services which are typically provided by a conventional OS (e.g., task scheduling, error handling, I/O services, etc.), as well as services that are typically provided by system firmware (e.g., the discovery and initialization of hardware components, the provision of software interfaces to those components, etc). An embedded OS may also provide services that are typically provided by programs or applications that run on top of an OS.

Figure 2:
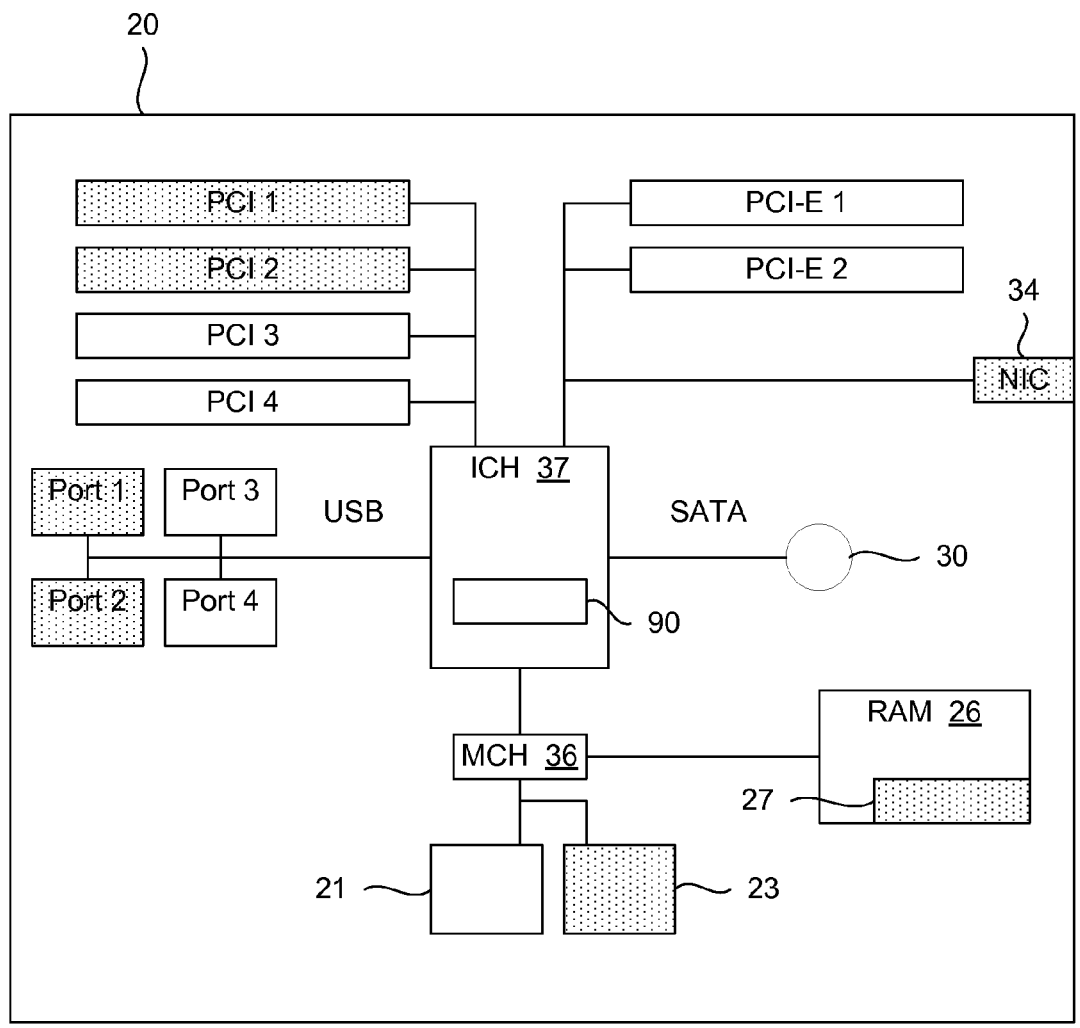
FIG. 2 is a block diagram providing additional details regarding some of the hardware components in the processing system of FIG. 1.

FIG. 2 is a block diagram providing additional details regarding some of the hardware components in the processing system of FIG. 1. FIG. 2 highlights the partitioning of the expansion slots and integrated devices in an example system. In particular, FIG. 2 shows dotted fill in the blocks for certain devices, to illustrate that those devices, or portions thereof, will be hidden from OS 60. For instance, in the example embodiment, the following components will be made available to sequestered partition 52 and hidden from OS 60:
 processing unit 23;
 NIC 34;
 USB ports 1 and 2; and
 PCI slots 1 and 2.
The following components may remain visible to, and available for use by, OS 60:
 processing unit 21;
 mass storage device 30;
 USB ports 3 and 4;
 PCI-Express (PCI-E) slots 1 and 2; and
 PCI slots 3 and 4.
Also, in the example embodiment, most of RAM 26 will remain visible to OS 60, but a portion 27 will be hidden from OS 60 and made available to sequestered partition 52.

In the example embodiment, the operations for sequestering devices are performed during the pre-boot portion of the initialization process that takes place when processing system 20 is turned on or reset. As described in greater detail below, in the example embodiment, BIOS 42 in main partition 50 has primary control of the initialization operations of processing system 20. For instance, referring again to FIG. 1, those operations may be controlled by instructions that implement a preboot manager 84. Preboot manager 84 may include various modules for handling different aspects of the initialization process, such as a boot device selection program 86, a BIOS loader 88, etc. Preboot manager 84 may reside in firmware 40, and some or all of preboot manager 84 may be copied to main partition 50 to form part of BIOS 42 in an early stage of the initialization process. Although preboot manager 84 in main partition 50 may have primary control of the initialization process, main partition 50 may pass control to sequestered partition 52 when appropriate, for instance to allow BIOS 46 to initialize or configure memory for sequestered partition 52.

Figure 3:
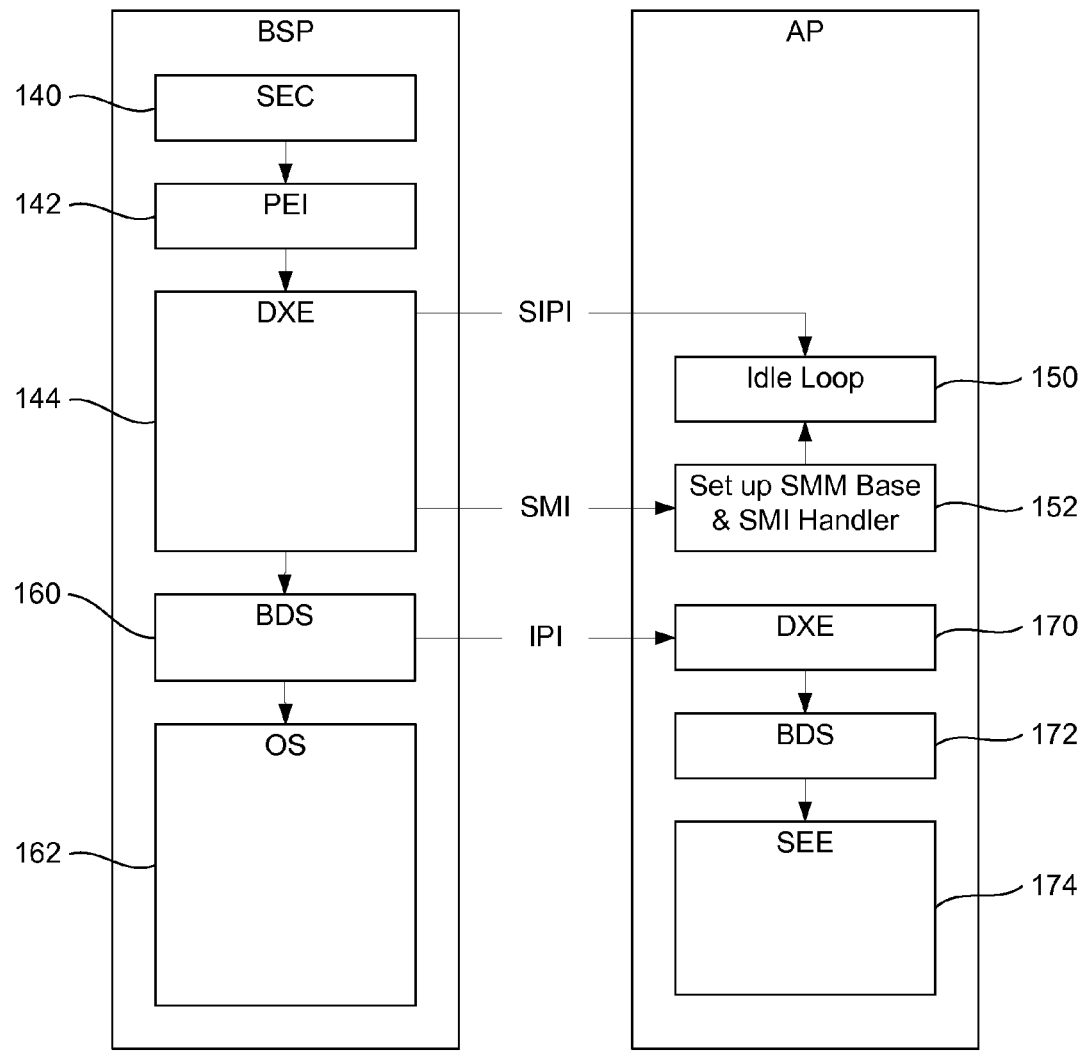
FIGS. 3 and 4 are flowcharts depicting various aspects of a process for supporting separate operating systems in partitions of a processing system, according to example embodiments of the present invention.
Figure 4:
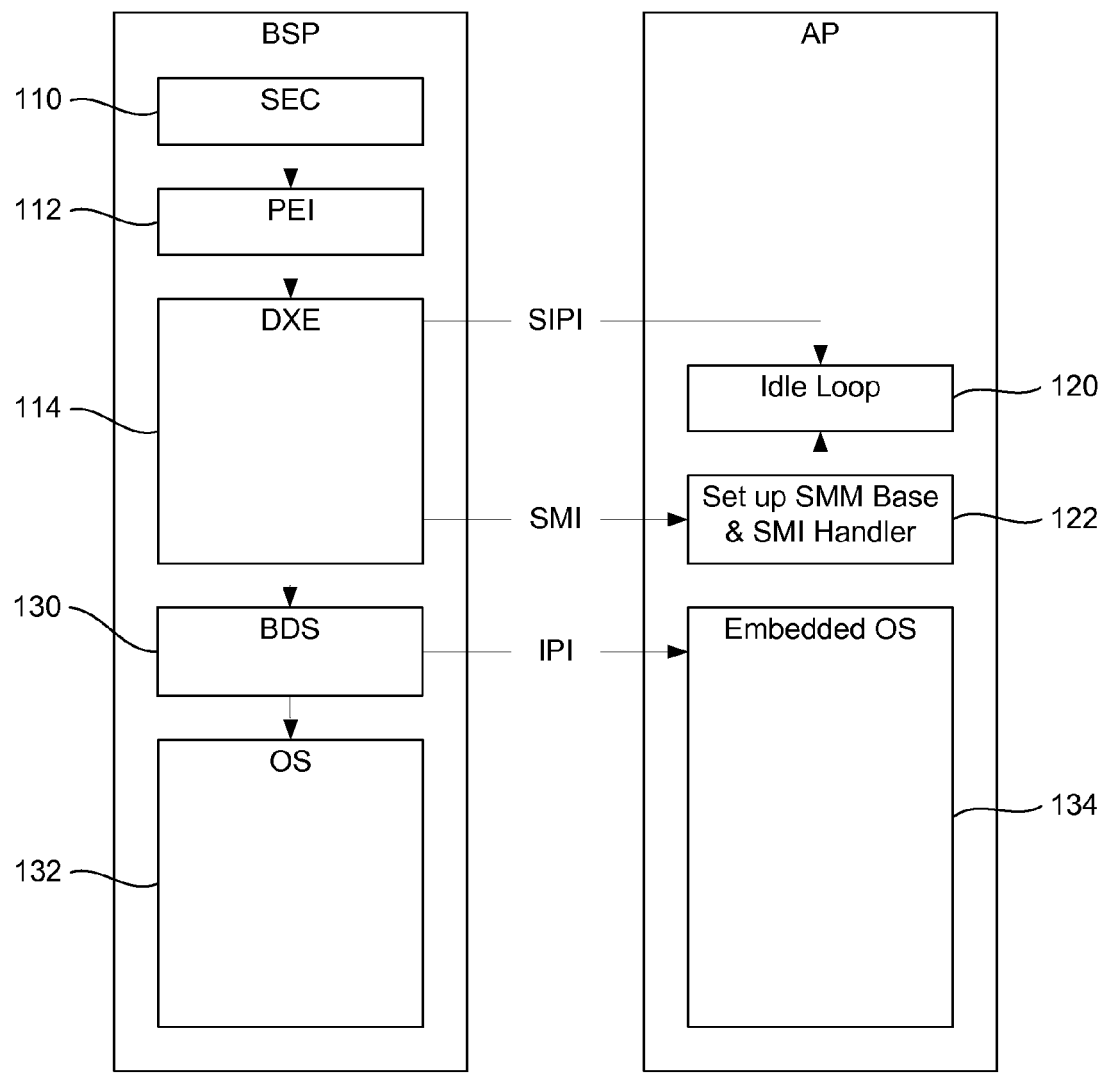

FIGS. 3 and 4 are flowcharts depicting various aspects of a process for supporting separate operating systems in partitions of a processing system, according to example embodiments of the present invention.

In the process of FIG. 3, a processing system uses a bootstrap processor (BSP) to boot a general purpose OS on a main partition, and the processing system uses an AP to boot a sequestered execution environment (SEE) on a sequestered partition. In one embodiment, the SEE includes a firmware layer, an OS layer, and a layer for applications. In one embodiment, processing unit 21 in processing system 20 serves as the BSP, processing unit 23 serves as the AP, and the SEE resides in sequestered partition 52. As described in greater detail below, the process of FIG. 3 involves execution of modules to create driver execution environment (DXEs) in main partition 50 and sequestered partition 52.

The process of FIG. 3 may start in response to processing system 20 being powered on or reset. Then, the BSP may begin executing preboot manager 84, and preboot manager 84 may cause the BSP to perform various initialization operations. For example, as shown at block 140, the BSP may perform certain security (SEC) functions (e.g., validating the code image for firmware 40). After successful completion of the SEC phase, the BSP may execute one or more pre-EFI initialization (PEI) modules to perform certain PEI functions, as shown at block 142. For example, the PEI functions may include initializing RAM 26 and configuring processing system 20 to create two different memory areas: one to serve as the RAM for main partition 50, and the other to serve as the RAM for sequestered partition 52. For example, the processing system may use operations like those described below with regard to FIGS. 6 and 7 to create the main memory area and the sequestered memory area. In other embodiments, a processing system may contain more than one main memory area and/or more than one sequestered memory area. In the example embodiment, the mechanisms for preventing main partition 50 from accessing the memory of sequestered partition 52 are not activated until later in the boot process.

Figure 5:
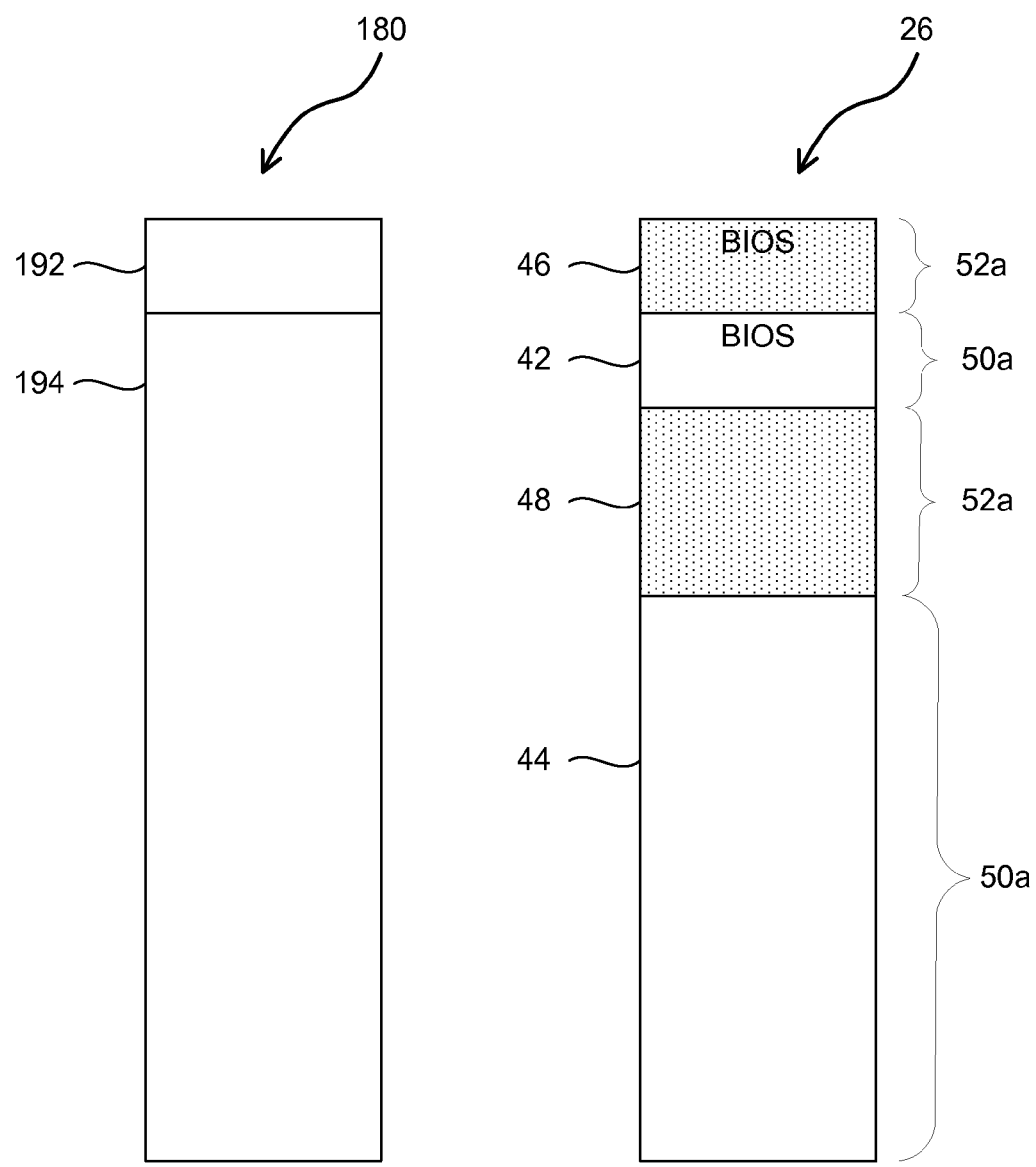
FIG. 5 is a block diagram illustrating a memory configuration according to an example embodiment of the present invention, and a memory configuration from an example processing system without sequestering.

FIG. 5 is a block diagram illustrating a memory configuration according to an example embodiment of the present invention, and a memory configuration from an example processing system without sequestering. The column on the right represents the physical address space of the RAM 26. The two brackets 50a illustrate that portions of that address space have been configured to serve as the memory for main partition 50, and brackets 52a illustrate that other portions of that address space have been configured to serve as the memory for sequestered partition 52. After the boot process is finished, most of the information that constitutes main partition 50 may reside in main partition memory 50a, and most of the information that constitutes sequestered partition 52 may reside in sequestered partition memory 52a. Other pieces of information associated with main partition 50 and sequestered partition 52 may reside in other hardware components, such as registers in an MCH 36, registers in ICH 37, etc. Sequestered partition memory 52a may correspond to sequestered memory 27 in FIG. 2.

As part of the configuration process, the BSP may execute one or more of the PEI modules twice: once in the memory space or memory context of the main partition, and once in the memory context of the sequestered partition. For instance, the BSP may call a function such as PEI_mem_init with the actual starting and ending physical memory addresses of RAM 26. The PEI_mem_init function may then configure RAM 26 to have a first BIOS region 46 occupying the highest one megabyte (MB) of RAM 26. The PEI_mem_init function may also load firmware code into BIOS region 46 and prepare data in BIOS region 46 to be passed to a subsequent stage. Accordingly, functions such as PEI_mem_init may be referred to as a code loader or BIOS loader 88.

The BSP may then call BIOS loader 88 with the same or a different starting address, and with a new ending address. In one embodiment, the ending address is just before the beginning of BIOS region 46. Thus, the BSP may hide BIOS region 46. BIOS loader 88 may then configure RAM 26 to have a second BIOS region 42 occupying the highest megabyte within the specified address range. BIOS loader 88 may also load firmware code into BIOS region 42 and prepare data in BIOS region 42 to be passed to a subsequent stage. Thus, in such an embodiment, the sequestered BIOS region 46 may occupy the highest MB of RAM 25, and the main BIOS region 42 may occupy the next highest MB of RAM 26. BIOS loader 88 may also configure RAM 26 to have a general purpose region 48 for the sequestered partition, and a general purpose region 44 for the main partition.

In other embodiments, distinct address ranges may be used to create two or more BIOS regions. For instance, for the second call to BIOS loader 88, an ending address significantly below the beginning of BIOS region 46 may be used, leaving enough space above that ending address to accommodate general purpose memory for the main partition between the main BIOS region and the sequestered BIOS region. Thus, in such an embodiment, a single area of main partition memory may include a general purpose region and an adjacent BIOS region, and a single area of sequestered partition memory may likewise include a general purpose region and an adjacent BIOS region.

In one embodiment, logical memory addresses starting with zero are assigned to the main partition and to the sequestered partition, BIOS region 42 occupies the highest megabyte (MB) of main partition memory 50a, and BIOS region 46 occupies the highest MB of sequestered partition memory 52a. In other embodiments, approaches other than zero-based addressing may be used. As shown in FIG. 5, after a single-partition processing system boots, its RAM 180 may not contain two different BIOS regions and two different general purpose regions, but only a single BIOS region 192 and a single general purpose region 194.

The description above indicates that the BSP could execute a PEI module twice to configure the different memory spaces for the different partitions. In an alternative embodiment, a processing system may use one or more different BIOS loaders or PEI modules to configure the different memory spaces.

Referring again to the example embodiment depicted in FIG. 3, after executing BIOS loader 88, the BSP may execute one or more modules to create a DXE in main partition 50, as indicated at block 144. The modules for creating the DXE may operate partially like conventional DXE modules. However, in one embodiment, the BSP marks the AP as disabled in the ACPI tables 92 for the BSP. In the DXE phase, the BSP may also use a start-up inter-processor interrupt (SIPI) to cause the AP to enter an idle loop 150. The BSP may also send a system management interrupt (SMI), a processor management interrupt (PMI), or a similar signal or message to the AP, to cause the AP to set up a system management mode (SMM) base and SMI handlers, as indicated at block 152. Once the SMI base and handlers have been set up, the AP may revert to executing the idle loop.

As indicated at block 160, the BSP then begins executing BDS program 86, thereby entering a boot device selection (BDS) phase. During BDS phase 160, instead of halting the AP, the BSP may send the AP a boot trigger. For instance, the BSP may send an inter-processor interrupt (IPI) to the AP, to instruct the AP to begin executing the DXE phase 170. The IPI may provide the entry point of the sequestered BIOS 46 that was loaded in the PEI phase, for instance. Also, the BSP may pass the AP the list of devices to be owned by sequestered partition 52.

The AP may then execute DXE phase 170. Execution by the AP may be similar to the execution in the BSP. However, in the example embodiment, one difference is that the AP skips functions like peripheral component interconnect (PCI) enumeration, and instead only initializes the devices to be owned by sequestered partition 52. The different execution paths for the BSP and the AP may be taken based on determinations, in each of DXE phases 144 and 170, whether the current processing unit is the BSP or an AP. For instance, one or more DXE modules may check the local advanced programmable interrupt controller (APIC), and may determine that the current processing unit is the BSP if the processor identifier (PID) is zero, and that the current processing unit is an AP if the PID is non-zero. Thus, the same DXE image may behave differently in main partition 50 than it does in sequestered partition 52, based on the PID.

The AP may then execute a BDS phase 172 and an SEE phase 174. In the example embodiment, since the lowest portion 50a of RAM 26 is owned by main partition 50, SEE phase 174 begins with the AP booting an SEE that does not require zero-based physical memory.

While the AP is in the DXE phase 170, the BDS phase 172, or the SEE phase 174, the BSP may pass from its BDS phase 160 to an OS phase 162. Thus, the AP need not sit idle waiting for the BSP to boot an OS. Instead, the AP may complete the operations of the DXE phase and the BDS phase, and may start the SEE phase before the BSP has loaded an OS or completed the BDS phase.

In the example embodiment described above, a single firmware image is shared by the different partitions, and that image is used to perform global initialization of the platform as well initialization of the local environment for each partition. The BSP can boot any suitable OS, including any suitable, conventional, off-the-shelf OS. Main partition 50 and sequestered partition 52 may then operate as independent processing environments.

In the example embodiment, the BSP partition owns the low memory and boots the general purpose OS, while the AP partition owns high memory and boots the SEE. However, these roles may be swapped in other embodiments.

In the process of FIG. 4, a processing system uses a BSP to boot a general purpose OS on a main partition, and the processing system uses an AP to boot an embedded OS on a sequestered partition. In one embodiment, processing unit 21 in processing system 20 may serve as the BSP, and processing unit 23 may serve as the AP. The process of FIG. 4 may start in response to processing system 20 being powered on or reset. Then, as shown at blocks 110 and 112, the BSP may perform certain security functions and PEI functions, such as those described above with regard to FIG. 3. The process of FIG. 4 also includes a DXE phase 114, like the corresponding phase in FIG. 3, in which the BSP uses a SIPI and SMIs to set up an SMM base and SMM handlers for the AP, and to put the AP in an idle loop, as shown at blocks 120 and 122.

The BSP may then begin executing BDS program 86, thereby starting a BDS phase 130. In BDS phase 130, the BSP may construct a parameter structure with sequestering information, such as a memory map identifying the portions of physical memory to be used as sequestered memory, a list of devices to be available to the sequestered partition, etc. Also, the BSP may copy that parameter structure to a predetermined or well known region in the sequestered memory. In addition, the BSP may extract an embedded OS image from storage (e.g., from a region of flash memory, from a special area of a hard disk, or from some other non-volatile storage device), and may copy that image to a predetermined or well-known region in the sequestered memory.

The BSP may then send a boot trigger to the AP. For example, the BSP may issue an IPI with the AP as the target processor and the first instruction of the embedded OS as the address at which the target processor should start executing. As indicated at block 134, the AP may then execute the embedded OS within the sequestered partition. Furthermore, the embedded OS may operate in the sequestered partition independently of, and unknown to, the OS in the main partition.

After transmitting the IPI that triggers execution of the embedded OS in the sequestered partition, the BSP may proceed with selection of a boot device for the main partition. The BSP may then use that boot device to launch an OS in the main partition, as indicated at block 132.

Figure 6:
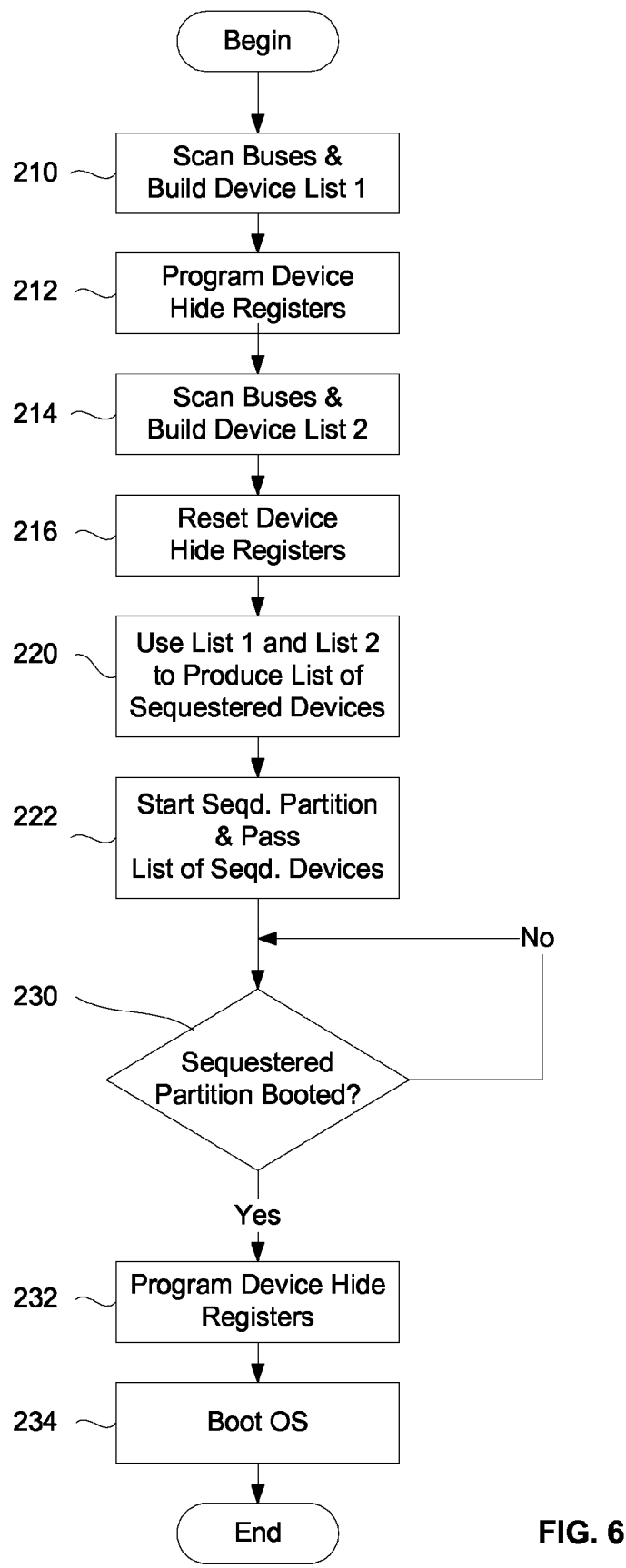
FIGS. 6 and 7 are flowcharts depicting various aspects of a process for assigning devices to a partition, according to an example embodiment of the present invention.
Figure 7:
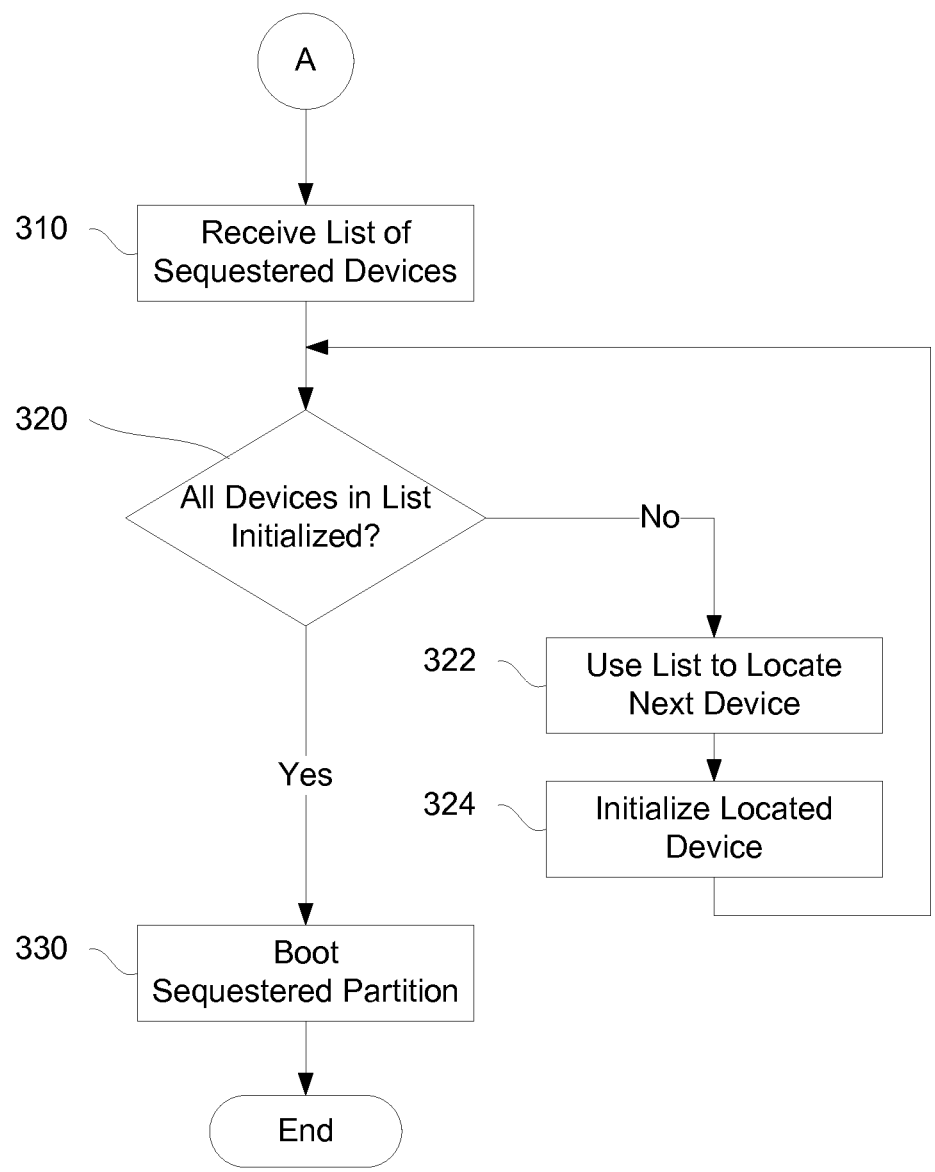

FIGS. 6 and 7 are flowcharts depicting various aspects of a process for assigning devices to a partition, according to an example embodiment of the present invention. In particular, FIG. 6 represents the perspective of main partition 50, while FIG. 7 represents the perspective of sequestered partition 52.

FIG. 6 begins with processing system 20 at or near the beginning of an initialization process. That process may have started in response to processing system 20 being powered on or reset, for instance. At block 210, BIOS 42 in main partition 50 may scan all PCI buses in processing system 20, as well as any other buses, and may build a first device list identifying all of the devices discovered on those buses. For instance, in the example embodiment, processing system 20 may scan one or more PCI buses, PCI-E buses, USB buses, industry standard architecture (ISA) buses, etc. In alternative embodiments, other types of buses may be scanned. The process of scanning buses in a processing system to determine which devices are present may be referred to in general as a bus scan. A bus scan may include operations such as the programming of bridges and device base address registers (BARs).

When building the first device list, main partition 50 may include the location information for some or all of the devices discovered during the first scan. For example, the location information may include the bus number, the device number, the function number, and the device type for each discovered device. The device type or any other suitable flag or data item may be used to keep track of which devices are bridges. For bridges, the local information may also identify the type of bridge and may include other information associated with a bridge, such as subordinate bus information.

As indicated at block 212, after the first device list has been built, main partition 50 may program device hide registers 90 and/or similar configuration constructs to hide certain predetermined devices. This programming may set or clear bits in the configuration constructs, based on a pre-selected device distribution. For instance, ROM 28 may have been pre-programmed by a user (e.g., a manufacturer, an administrator, an end user, etc.) with configuration information that specifies which devices are to be used by sequestered partition 52 and hidden from main partition 50. In alternative embodiments, the main partition may retrieve the configuration information from any other suitable data repository.

The configuration information may identify the devices to be hidden by specifying how device hide registers 90 and similar configuration constructs are to be configured. For instance, processing system 20 may assign the device number 0 to a device in the expansion slot labeled PCI 1 in FIG. 2, and if an administrator has configured processing system 20 to hide that device, the configuration information may include data indicating that bit 0 of a Secondary PCI Device Hiding (SPDH) register should be set to 1. The configuration information in ROM 28 may use similar approaches to identify other types of devices to be hidden, such as SATA controllers, an onboard NIC, devices on other types of buses, etc. For instance, the configuration information may include data indicating that main partition 50 is to use a function disable (FD) register to hide particular devices on PCI-E buses, USB buses, etc.

As indicated at block 214, main partition 50 may then perform a second bus scan, and may build a second device list to identify all of the devices detected during the second scan. Main partition 50 may then reset the configuration constructs to unhide or unblock any hidden devices, as indicated at block 216. Also, as shown at block 220, main partition 50 may compare the first and second device lists and produce a list of devices to be sequestered, to include the devices found in the first scan but not in the second scan. The list produced based on the comparison may be referred to as the list of sequestered devices, and that list may include the same type of location information as the first device list, for each device to be sequestered.

As shown at block 222, main partition 50 may then start sequestered partition 52, and may pass the list of devices to be sequestered to sequestered partition 52. Since no devices will be hidden, in accordance with block 216 of FIG. 6, sequestered partition 52 will be able to read the configuration space of the devices to be sequestered.

As indicated at block 230, after sending the sequestered device list to sequestered partition 52, main partition 50 may wait until sequestered partition 52 has booted. As shown at block 232, after sequestered partition 52 has booted, main partition 50 may again program configuration constructs such as device hide registers 90 to hide the sequestered devices from main partition 50. Main partition 50 may then boot OS 60, as indicated at block 234. The process of FIG. 6 may then end.

In one embodiment, the operations depicted in blocks 222, 230, and 232 may be performed in the BDS phase 160 of FIG. 3 or the BDS phase 130 of FIG. 4. For instance, the BSP may send the IPI to the AP before passing the list of sequestered devices. Then, once the BSP determines that the AP has completed DXE phase 170, the BSP may program device hide registers, as shown at block 232 of FIG. 6. The BSP may then move to the OS phase, as shown at block 234 of FIG. 6 and block 162 of FIG. 3.

The process of FIG. 7 may start in response to the operations depicted at block 222 of FIG. 6, when main partition 50 starts sequestered partition 52. As indicated at block 310 of FIG. 7, once started, sequestered partition 52 may receive from main partition 50 the list of devices to be sequestered. Sequestered partition 52 may then initialize the devices on the list without performing a bus scan.

For instance, sequestered partition may determine whether all of the devices on the list have been initialized, as shown at block 320. If sequestered partition 52 has not yet initialized all of the devices on the list, sequestered partition may select a next device to be initialized, and may use information in the list such as the bus number, the device number, the function number, and the device type for the selected device to locate that device, as shown at block 322. As indicated at block 324, sequestered partition may then initialize that device. When initializing a device, sequestered partition 52 may extract whatever information it requires from the configuration space of that device, and may perform any other operations necessary to configure the device, such as programming BARs of the device and possibly executing an option ROM of the device. However, in the example embodiment, sequestered partition 52 avoids reprogramming any bridges or device BARs, since, depending on the bus topology, reconfiguring bridges or device BARs could render the bridges or devices inaccessible. Also, in the example embodiment, sequestered partition 52 does not initialize any devices that aren't assigned to it (i.e., that are not included in the list of sequestered devices).

The above operations may be performed as part of the DXE phase 170 of FIG. 3, or as part of the embedded OS phase 134 of FIG. 4, for example. Once all of the devices for sequestered partition 52 have been initialized, sequestered partition 52 may boot OS 62, as indicated at block 330, and sequestered partition 52 may use the sequestered devices. The process of FIG. 7 may then end.

Thus, one partition in a processing system may discover locations of devices to be sequestered, and may pass a list with location information for those devices to a second partition. The second partition may then initialize those devices. Device hide registers and/or related configuration constructs may then be programmed to hide or block those devices for the first partition. In the example embodiment, the device hide registers are so programmed before the OS on the first partition boots. In various embodiments, functions like programming the ICH registers to block configuration access to the sequestered devices may be performed by the either partition. In the example embodiment, the location of each sequestered device is provided to the sequestered partition, and the sequestered partition therefore need not perform a bus scan. The sequestered partition may therefore avoid the ambiguous results that could happen if the sequestered partition were to scan buses containing multiple instances of the same type of device (e.g., USB ports). In addition, even though the main partition may set device hide registers and/or related settings after the sequestered partition has booted, the sequestered partition may continue to use the hidden devices since the ICH may block configuration cycles for the sequestered devices, but it may not block access to the I/O addresses and memory mapped registers of those devices.

Also, as indicated above, a processing system may contain more than one main partition, more than one sequestered partition, or multiple main partitions and sequestered partitions. Such processing systems may use variations of the process described above to implement sequestered devices for one or more sequestered partitions.

As has been described, a processing system may run two (or more) OSs independently, without expensive hardware-based partitioning or underlying software management layers such as a VMM. Instead, pre-OS firmware may carve out a region of memory, copy a bootable OS image into that region, and then issue an IPI to a targeted processing unit to cause that OS to run on that processing unit. The processing system may also support another OS running on another processing unit, and the different OSs may operate completely or substantially independently of each other. Further, an OS on one partition may have no knowledge of any of the sequestered resources.

In light of the principles and example embodiments described and illustrated herein, it will be recognized that the described embodiments can be modified in arrangement and detail without departing from such principles. Also, although the foregoing discussion has focused on particular embodiments, other configurations are contemplated as well. Even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media containing instructions for performing the operations of the invention. Such embodiments may also be referred to as program products. Such machine-accessible media may include, without limitation, storage media such as floppy disks, hard disks, CD-ROMs, ROM, and RAM, and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing functionality such as that described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for booting partitions in a processing system, the method comprising:
    during initialization of the processing system:
    creating a first basic input/output system (BIOS) region for a main partition of the processing system using a BIOS loader;
    creating a second BIOS region for a sequestered partition of the processing system using the BIOS loader;
    booting an operating system in the main partition, the main partition running on one or more first processing units of the processing system;
    booting the sequestered partition using software stored in a sequestered area of memory of the processing system, wherein the sequestered area of memory is hidden from the main partition, the sequestered partition running on one or more second processing units of the processing system, and wherein the sequestered partition is hidden from the operating system of the main partition; and
    controlling, by the sequestered partition, a device of the processing system by accessing memory of the main partition, wherein the device of the processing system is viewable by the main partition.

2. The method of claim 1, wherein the one or more second processing units are hidden from the one or more first processing units.

3. The method of claim 1, wherein the one or more second processing units are hidden from the operating system.

4. The method of claim 1, further comprising after booting the sequestered partition, operating the sequestered partition independently of the main partition.

5. One or more non-transitory, machine-accessible storage media having instructions stored thereon that, when executed, cause a processing system to perform a method, the method comprising:
    during initialization of the processing system:
    creating a first basic input/output system (BIOS) region for a main partition of the processing system using a BIOS loader;
    creating a second BIOS region for a sequestered partition of the processing system using the BIOS loader;
    booting an operating system in the main partition, the main partition running on one or more first processing units of the processing system;
    booting the sequestered partition using software stored in a sequestered area of memory of the processing system, wherein the sequestered area of memory is hidden from the main partition, the sequestered partition running on one or more second processing units of the processing system, and wherein the sequestered partition is hidden from the operating system of the main partition; and
    controlling, by the sequestered partition, a device of the processing system by accessing memory of the main partition, wherein the device of the processing system is viewable by the main partition.

6. The one or more non-transitory, machine-accessible storage media of claim 5, wherein the one or more second processing units are hidden from the one or more first processing units.

7. The one or more non-transitory, machine-accessible storage media of claim 5, wherein the one or more second processing units are hidden from the operating system.

8. The one or more non-transitory, machine-accessible storage media of claim 5, further comprising copying the software to the sequestered area of memory from BIOS.

9. The one or more non-transitory, machine-accessible storage media of claim 5, further comprising after booting the sequestered partition, operating the sequestered partition independently of the main partition.

10. The one or more non-transitory, machine-accessible storage media of claim 5, wherein the first BIOS region is used to boot the main partition and the second BIOS region is used to boot the sequestered partition.

11. The one or more non-transitory, machine-accessible storage media of claim 5, further comprising utilizing the sequestered partition for I/O offloading.

12. The one or more non-transitory, machine-accessible storage media of claim 5, further comprising utilizing the sequestered partition for platform manageability.

13. The one or more non-transitory, machine-accessible storage media of claim 5, further comprising utilizing the sequestered partition for fault prediction.

14. A processing system comprising:
    one or more first processing units;
    one or more second processing units; and
    memory storing instructions that, when executed, cause the processing system to perform a method, the method comprising:
    during initialization of the processing system:
    creating a first basic input/output system (BIOS) region for a main partition of the processing system using a BIOS loader;
    creating a second BIOS region for a sequestered partition of the processing system using the BIOS loader;
    booting an operating system in the main partition, the main partition running on one or more first processing units of the processing system;
    booting the sequestered partition using software stored in a sequestered area of memory of the processing system, the sequestered area of memory being hidden from the main partition, the sequestered partition running on one or more second processing units of the processing system, and wherein the sequestered partition is hidden from the operating system of the main partition; and
    controlling, by the sequestered partition, a device of the processing system by accessing memory of the main partition, wherein the device of the processing system is viewable by the main partition.

15. The processing system of claim 14, wherein the one or more second processing units are hidden from the one or more first processing units.

16. The processing system of claim 14, wherein the one or more second processing units are hidden from the operating system.

17. The processing system of claim 14, further comprising utilizing the sequestered partition for I/O offloading.

18. The processing system of claim 14, further comprising utilizing the sequestered partition for platform manageability.

19. The processing system of claim 14, further comprising utilizing the sequestered partition for fault prediction.

20. The processing system of claim 14, further comprising copying the software to the sequestered area of memory from BIOS.

21. The processing system of claim 14, further comprising after booting the sequestered partition, operating the sequestered partition independently of the main partition.

22. The processing system of claim 14, wherein the first BIOS region is used to boot the main partition and the second BIOS region is used to boot the sequestered partition.

23. One or more non-transitory, machine-accessible storage media having instructions stored thereon that, when executed, cause a processing system to perform a method, the method comprising:

during initialization of the processing system:
creating a first basic input/output system (BIOS) region for a first execution environment of the processing system using a BIOS loader;
creating a second BIOS region for a second execution environment of the processing system using the BIOS loader;
booting an operating system in the first execution environment, the first execution environment running on one or more first processing units of the processing system;
booting the second execution environment using software stored in a sequestered area of memory of the processing system, the sequestered area of memory being hidden from the first execution environment, the second execution environment running on one or more second processing units of the processing system, and wherein the second execution environment is hidden from the operating system of the first execution environment; and
controlling, by the second execution environment, a device of the processing system by accessing memory of the first execution environment, wherein the device of the processing system is viewable by the first execution environment.

24. The one or more non-transitory, machine-accessible storage media of claim 23, wherein the one or more second processing units are hidden from the one or more first processing units.

25. The one or more non-transitory, machine-accessible storage media of claim 23, further comprising after booting the second execution environment, operating the second execution environment independently of the first execution environment.

* * * * *